(12) United States Patent  (10) Patent No.: US 7,502,691 B2
Romero  (45) Date of Patent: Mar. 10, 2009

(54) METHOD AND COMPUTER PROGRAM PRODUCT FOR DETERMINING A DEGREE OF SIMILARITY BETWEEN WELL LOG DATA

(75) Inventor: Pedro A. Romero, Buenos Aires (AR)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/831,040

(22) Filed: Jul. 31, 2007

(65) Prior Publication Data

US 2009/0037109 A1    Feb. 5, 2009

(51) Int. Cl.
*G01V 3/18* (2006.01)
*G01V 3/38* (2006.01)
(52) U.S. Cl. .......................................................... 702/7
(58) Field of Classification Search ...................... 702/7
See application file for complete search history.

(56) References Cited

U.S. PATENT DOCUMENTS

| | | | |
|---|---|---|---|
| 4,710,713 A | 12/1987 | Strikman | |
| 4,933,638 A * | 6/1990 | Kleinberg et al. | 324/303 |
| 5,712,566 A | 1/1998 | Taicher et al. | |
| 6,703,832 B2 * | 3/2004 | Heaton et al. | 324/303 |
| 7,075,297 B2 * | 7/2006 | Freedman | 324/303 |
| 7,091,719 B2 * | 8/2006 | Freedman | 324/303 |
| 7,253,617 B1 * | 8/2007 | Chen et al. | 324/303 |
| 7,309,983 B2 * | 12/2007 | Freedman | 324/303 |
| 2004/0027122 A1 * | 2/2004 | Heaton et al. | 324/303 |
| 2007/0055456 A1 * | 3/2007 | Raftery et al. | 702/19 |
| 2008/0154509 A1 * | 6/2008 | Heaton | 702/7 |

OTHER PUBLICATIONS http://en.wikipedia.org/wiki/Correlation, Jul. 26, 2007.
http://en.wikipedia.org/wiki/P-value, Jul. 3, 2007.

\* cited by examiner

*Primary Examiner*—Michael P. Nghiem
*Assistant Examiner*—Cindy H Khuu
(74) *Attorney, Agent, or Firm*—Cantor Colburn LLP

(57) ABSTRACT

A computer program product includes machine readable instructions stored on machine readable media, the instructions for correlating nuclear magnetic resonance (NMR) well logging data with other well logging data, the product including instructions for: receiving the NMR well logging data; receiving the other well logging data; determining a tendency of the NMR logging data to correlate with the other logging data and providing output including correlation information. A system is also provided.

11 Claims, 7 Drawing Sheets

METHOD AND COMPUTER PROGRAM PRODUCT FOR DETERMINING A DEGREE OF SIMILARITY BETWEEN WELL LOG DATA

BACKGROUND OF THE INVENTION

1. Field of the Invention

The invention disclosed herein relates to correlation of well logging data and, in particular, to correlation of bin logs derived from nuclear magnetic resonance (NMR) measurements to other logging data.

2. Description of the Related Art

In the field of geophysical exploration, a variety of technologies is employed for logging a well. The variety includes nuclear magnetic resonance (NMR), resistivity, saturation and others. Each technology has assets and liabilities. Accordingly, refinements to the various technologies are always in the works. For example, consider well logging using NMR.

In NMR well logging, an NMR probe is disposed into a wellbore. The NMR probe is used to conduct NMR measurements downhole. An improved technique for well logging with NMR involves use of the transverse relaxation time, $T_2$, of media surrounding the NMR probe.

Fluid typing analyses of distributions of relaxation time, T, (e.g., the transverse relaxation time, $T_2$, as well as the longitudinal relaxation time, $T_1$) faces the problem of discriminating individual contributions of water and hydrocarbons, especially when signals from the water and hydrocarbons may not be easily discriminated from each other (that is, the signals are overlapping). For example, in the case of heavy oil, the overlap of the oil distribution with at least one of clay bound water and capillary bound water is very common. When there is no significant contrast in the diffusivity between the fluids, the fluid typing represent a difficult problem to solve, because in presence of a magnetic field gradient, the distribution of the transverse relaxation time, $T_2$, for the various fluids present in the wellbore overlaps and cannot easily be cancelled. Other problems are encountered with regard to distributions of the diffusivity, D, that complicate fluid typing.

Therefore, what are needed are techniques for correlating logging information for at least the transverse relaxation time, $T_2$, the longitudinal relaxation time, $T_1$, and the diffusivity, D, with other types of logging data, such as those disclosed herein.

BRIEF SUMMARY OF THE INVENTION

Disclosed is a computer program product including machine readable instructions stored on machine readable media, the instructions for correlating nuclear magnetic resonance (NMR) well logging data with other well logging data, the product including instructions for: receiving the NMR well logging data; receiving the other well logging data; determining a tendency of the NMR logging data to correlate with the other logging data and providing output including correlation information.

Also disclosed is a system for providing correlated well logging data, the system including: components for executing machine readable instructions stored on machine readable media, the instructions for correlating nuclear magnetic resonance (NMR) well logging data with other well logging data, and including instructions for receiving the NMR well logging data; receiving the other well logging data; and determining a tendency of the NMR logging data to correlate with the other logging data; and an output for outputting to a user correlation information as the correlated well logging data.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are techniques for correlating well logs for at least one of transverse relaxation time, $T_2$, longitudinal relaxation time, $T_1$, and diffusivity, D, with other information such as well logs, derived quantities and reference information. The correlation provides for determiination of similarities between the logs and improved interpretation of logging information in general. Accordingly, the correlation provides for improved identification of hydrocarbon bearing materials downhole.

Figure 1:
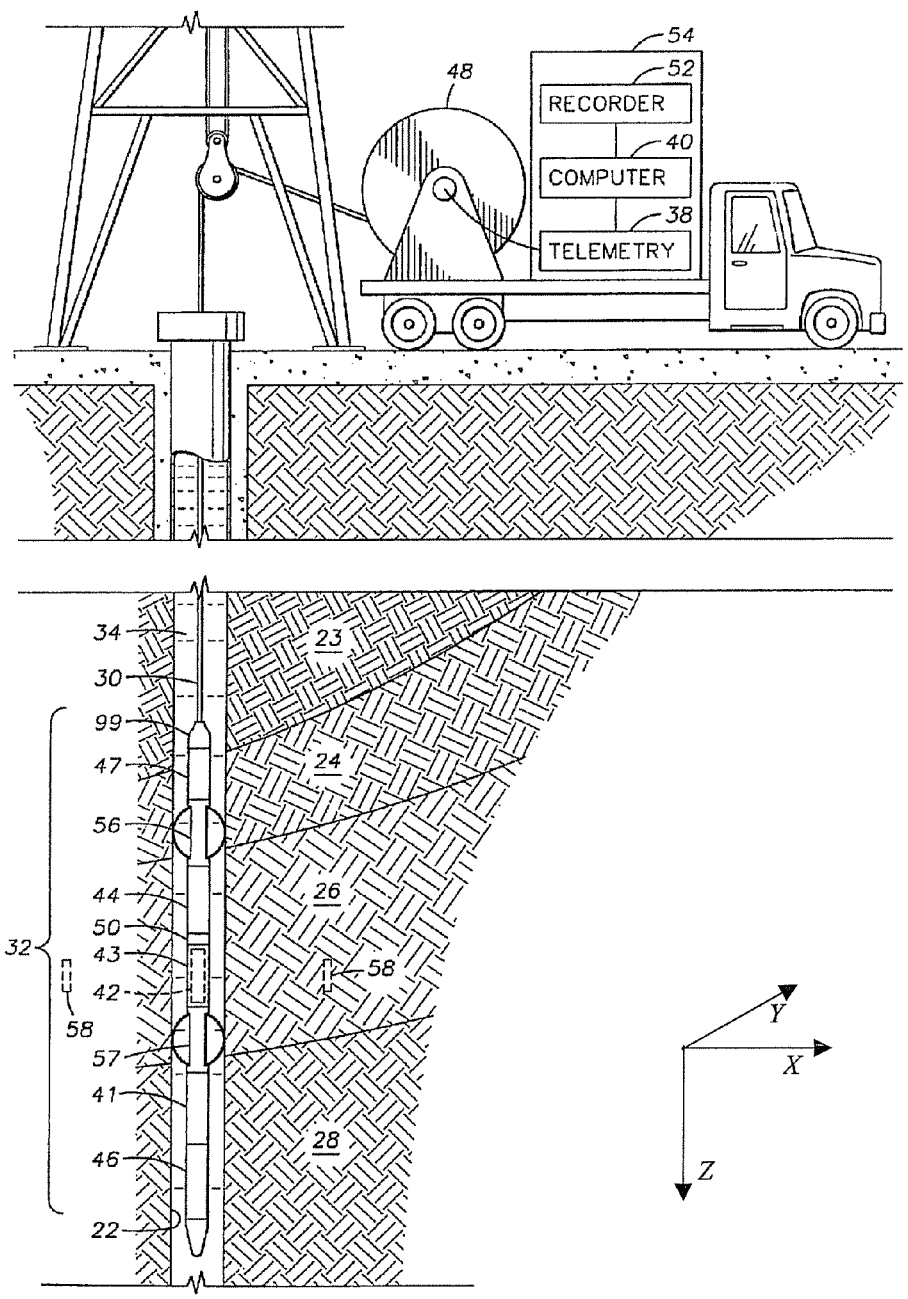
FIG. 1 depicts aspects of well logging with an nuclear magnetic resonance (NMR) apparatus.

Turning to FIG. 1, consider aspects of downhole NMR characterizations, using a non-limiting embodiment of a wireline logging device. One skilled in the art will recognize that the techniques disclosed herein can be applied with other embodiments, such as logging-while-drilling (LWD) or measurements-while-drilling (MWD) operations.

FIG. 1 shows a well logging apparatus disposed in a wellbore 22 penetrating earth formations 23, 24, 26, 28 for making measurements of properties of the earth formations 23, 24, 26, 28 downhole. The wellbore 22 in FIG. 1 is typically filled with a fluid 34 known in the art as "drilling mud." A "sensitive volume," shown generally at 58 and having a generally cylindrical shape, is disposed in one of the earth formations, shown at 26. The sensitive volume 58 is a predetermined portion of the earth formations 26 in which nuclear magnetic resonance (NMR) measurements are made.

In typical embodiments, the sensitive volume 58 includes materials such as would be found downhole (below the surface and within or around the wellbore 22) including a mixture of liquids including gas, water, drilling fluid, oil and formation fluids that are indigenous to the formations 23, 24, 26, 28.

A string of logging tools 32, which can include an NMR apparatus according to the present invention, is typically lowered into the wellbore 22 by, for example, an armored electrical cable 30. The cable 30 can be spooled and unspooled from a winch or drum 48. The tool string 32 can be electrically connected to surface equipment 54 by an insulated electrical conductor (not shown separately in FIG. 1) forming part of the cable 30. The surface equipment 54 can include one part of a telemetry system 38 for communicating control signals and data to the tool string 32 and computer 40. The computer may also include a data recorder 52 for recording measurements made by the apparatus and transmitted to the surface equipment 54. Typically, the computer includes a variety of input/output devices and other supporting devices to enhance the operation of the apparatus and estimations performed by use thereof. An NMR probe 42 can be included in the tool string 32.

Circuitry for operating the NMR probe 42 can be located within an NMR electronics cartridge 44. The circuitry can be connected to the NMR probe 42 through a connector 50. The NMR probe 42 is typically located within a protective housing 43 which is designed to exclude the drilling mud 34 from the interior of the probe 42. The function of the probe 42 will be further explained.

Other well logging sensors (not shown separately for clarity of the illustration in FIG. 1) may form part of the tool string 32. As shown in FIG. 1, one additional logging sensor 47 may be located above the NMR electronics cartridge 44. Other logging sensors, such as shown at 41 and 46 may be located within or below the bottom centralizer 57. The other sensors 41, 46, 47 can be of types familiar to those skilled in the art.

Other aspects of the exemplary embodiment of the NMR probe 42 are provided in U.S. Pat. No. 5,712,566, entitled "Nuclear Magnetic Resonance Apparatus and Method," issued Jan. 27, 1998 to Taicher et al., and incorporated herein by reference in it's entirety. Another non-limiting example is disclosed in U.S. Pat. No. 4,710,713, also issued to Taicher et al., and also incorporated by reference herein in it's entirety. It should be recognized that these embodiments of NMR tools are exemplary only, and not limiting of the teachings herein. A commercially available and exemplary embodiment of an NMR instrument is the MREX™, available from Baker Hughes, Incorporated of Houston Tex. (for wireline deployment). Another exemplary embodiment is referred to as MAGTRAK™, also available from Baker Hughes, Incorporated of Houston Tex. (generally useful for logging while drilling (LWD).

Although aspects of FIG. 1 are depicted as part of a two-dimensional (2D) diagram, it is recognized that the wellbore and measurements therein are performed in three-dimensions (3D). As depicted in FIG. 1, a coordinate system generally includes a Z-axis, a Y-axis and an X-axis. Analyses of logging data may consider data in correlation to any one or more of the axes of the coordinate system.

One skilled in the art will recognize that while the teachings herein may be performed downhole, they are also applicable to evaluations conducted on the surface, such as in a laboratory. For example, at least a portion of an evaluation or determination may be performed in one place or another. More specifically, in one embodiment, a property of a constituent may be determined in a laboratory, while other measurements and determinations are performed downhole. Additionally, aspects of the correlation may also be performed at another time. For example, correlation of NMR data may include correlation to resistivity (or other types of measurements) previously performed (downhole or on the surface).

As a matter of convention, one should note that the variables used herein appear throughout the disclosure. For convenience of referencing, the following representations are some of the definitions applied herein, or related to the teachings herein: $B_0$ represents static field strength; $B_1$ represents radiofrequency (RF) field strength; D represents diffusivity; f represents a proton fraction; G represents RF field gradient strength; M represents echo magnetization amplitude; where $M_z(t)$ represents a longitudinal magnetization, which involves a time constant $T_1$, where $T_1$, is the time required for the magnetization vector to be restored to 63% of its original amplitude (referred to as "longitudinal relaxation time"); $M_{x,y}$ represents a transverse magnetization, which involves a time constant $T_2$, where $T_2$ is the time required for the magnetization vector to drop to 37% of its original amplitude (referred to as "transverse relaxation time"); However, one skilled in the art will recognize that this listing is illustrative and not limiting of the teachings herein.

As discussed herein, the term "correlation" is generally used with reference to determining degrees of similarity between quantities. That is, "correlation" may be lineal or non-lineal, consider aspects of mutual information (such as those based on Entropy) and by any other technique deemed useful to a user. Accordingly, the term "correlation" generally makes reference to ways to define or search for a degree of similarity (or dissimilarity) between quantities.

As discussed herein, the term "bin" generally refers to points that are used to build a distribution. For example, a distribution of the transverse relaxation time, $T_2$, involves a plurality of $T_2$ bins. The term "log" is used with reference to at least one of data and data sets obtained from measurements performed downhole in a wellbore and may include some form of analysis of the data. The term "MATLAB" makes reference to a computer code that provides a high-level language and interactive environment that enables one to perform computationally intensive tasks. MATLAB is a product of The MathWorks, Inc. of Natick, Mass. While the disclosure generally makes reference to use of MATLAB, one skilled in the art will recognize that other computer codes may be used instead of MATLAB, and that some computer codes may be used in augmentation of another computer code. As non-limiting examples, other computer codes may include, C, C++, Fortran, MATHCAD and any other numerical computing environment and programming language deemed suitable. The teachings disclosed herein are generally performed by "software" which includes machine readable instructions stored on machine readable media, the instructions providing for the correlation and related functions. The software may be designed for at least one of execution within another program, such as MATLAB and independent operation (i.e., operation within an environment) as a compiled program.

In one embodiment, analysis of NMR measurement data may include constructing a log curve of each of the $T_2$ bins (points building the distribution of the transverse relaxation time, $T_2$), as well as each of the D bins (points building the distribution of the diffusivity, D). When taken as independent logs, the bins of the distribution of the transverse relaxation time $T_2$ and the distribution of the diffusivity, D, can be correlated with other logs or reference curves in order to search for similarities between them. Various correlations may be applied. However, for purposes of discussion herein, a linear correlation is used.

In some other embodiments, analysis involves constructing a log curve of each of the $T_1$ bins (points building the distribution of the longitudinal relaxation time, $T_1$)

As one example, by comparing the bin logs with the oil saturation (e.g. from the Archie equation provided below as Eq. (1)), it is possible to find out which bins or portion of a distribution correlates to the saturation. Correlation information can be used for fluid typing purposes. As stated above, correlation information may consider any one or more of the axes in the coordinate system.

An exemplary source of information for correlation to at least one of logs of the bins of the $T_2$ distribution and logs of the bins of the D distribution includes the Archie Equation, presented as Eq. (1):

$$S_w = [(a/\phi^m)*(R_w/R_t)]^{(1/n)} \qquad (1);$$

where:
$S_w$ represents water saturation;
$\phi$ represents porosity;
$R_w$ represents formation water resistivity;
$R_t$ represents observed bulk resistivity;
a represents a constant (often taken to be 1);
m represents a cementation factor (varies about 2); and,
n represents a saturation exponent (generally about 2).

Exemplary functions of the software include performing a search for similarities (i.e., a correlation) between at least one of $T_2$ bins and D bins with other data of various types (e.g. depth logs providing data associated with SP, GR, measurements for at least one of acoustic, seismic, neutron activation, natural radioactivity, induced gamma radioactivity (e.g., for density tool data), resistivity, mud logging, formation lithology and saturation (of water, hydrocarbon, and/or other such materials) and other quantities). Correlation may also be performed against spot samples (such as grab samples of fluids which are subsequently analyzed on the surface).

Figure 2:
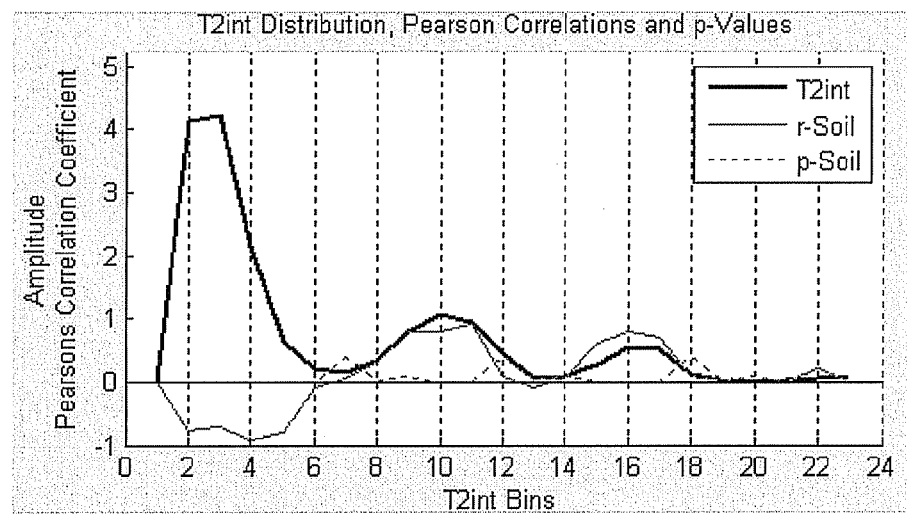
FIG. 2 and FIG. 3 depict exemplary graphic correlation results for one-dimensional (1D) analyses.
Figure 3:
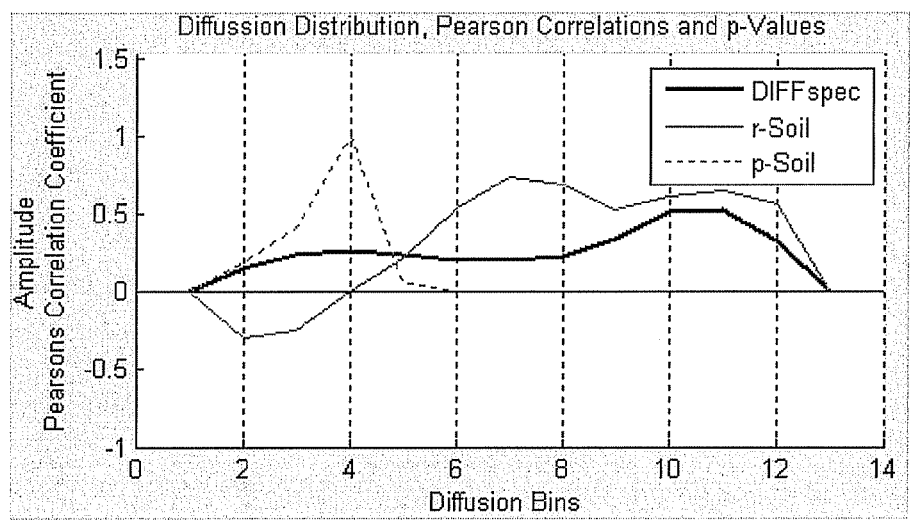

In some embodiments applying one-dimensional (1D) analyses, the software calculates correlations and the probability values (p-Values) of the correlation based on the Pearson Correlation equation (provided herein as Eq. (2) below). Reference may be had to FIGS. 2 and 3.

In FIG. 2, a transverse relaxation time, $T_2$, distribution and Pearson correlation with oil saturation is depicted. In FIG. 3, a distribution of diffusivity, D, and Pearson correlation with oil saturation is depicted.

In some embodiments applying two-dimensional (2D) analyses, the software generates a color code picture of the filled area under the distribution curves with a bar color for each bin according to its correlation with the reference log. Reference may be had to FIGS. 4 through 9.

Figure 4:
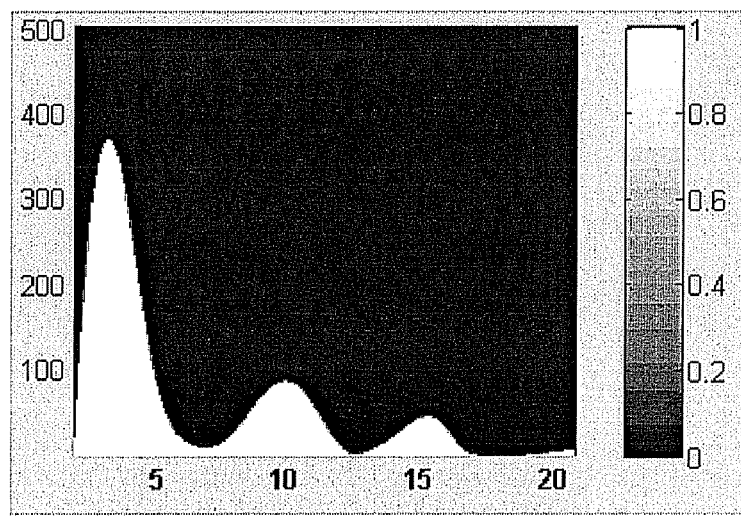
FIG. 4 through FIG. 9 depict exemplary graphic correlation results for two-dimensional (2D) analyses.
Figure 5:
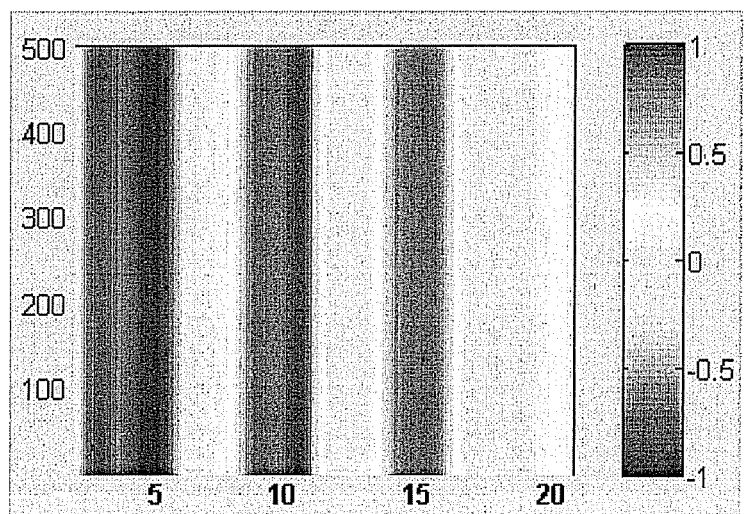
Figure 6:
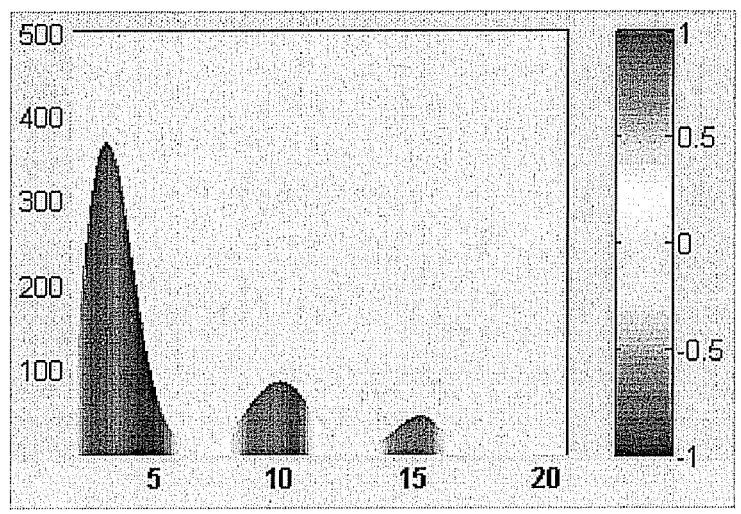
Figure 7:
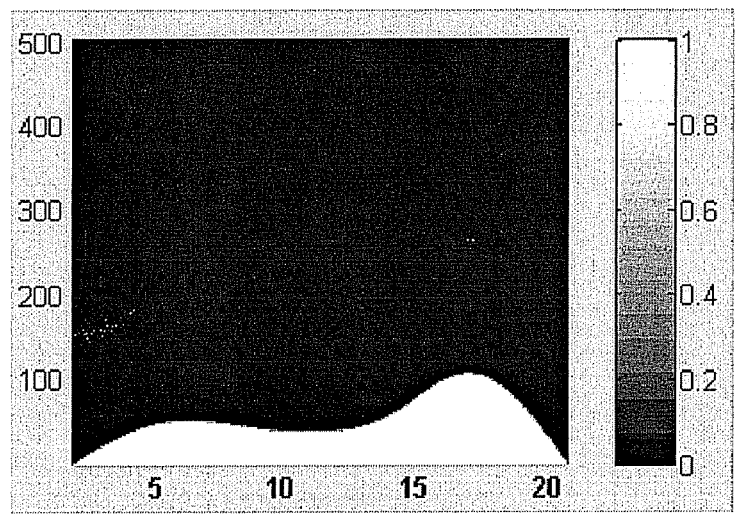
Figure 8:
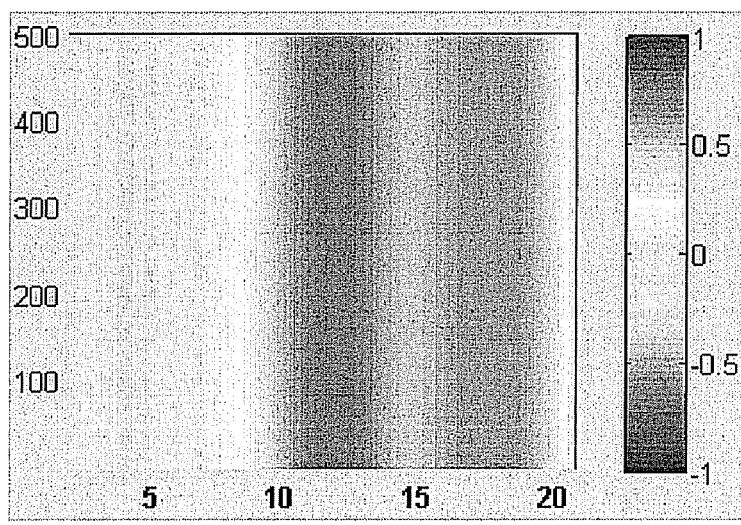
Figure 9:
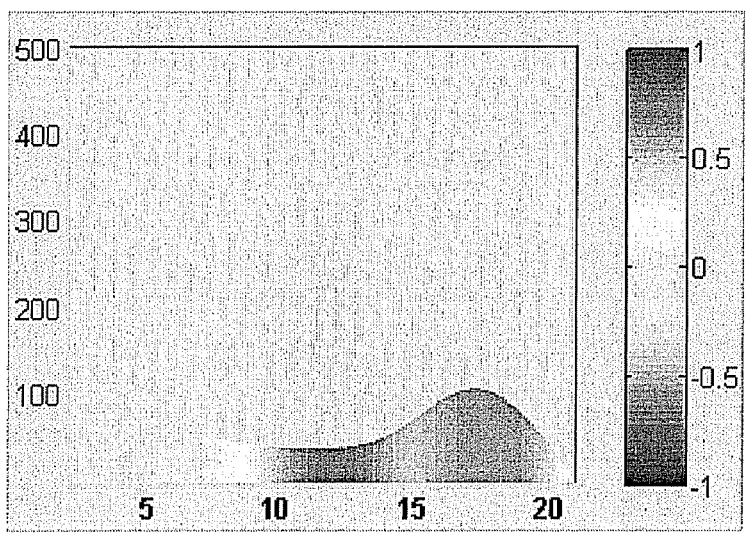

In FIG. 4, the distribution of the transverse relaxation time, $T_2$, with a filled area is depicted. In FIG. 5, Pearson correlation of the $T_2$ bins with oil saturation is depicted. In FIG. 6, the $T_2$ distribution with a Pearson Correlation overlay is depicted. In FIG. 7, a distribution of the diffusivity, D, with a filled area is depicted. In FIG. 8, Pearson correlation of $T_2$ bins with oil saturation is depicted. In FIG. 9, the distribution of diffusivity, D, with the Pearson Correlation as an overlay is depicted.

In some embodiments applying three-dimensional (3D) analyses, the software uses a map of the diffusivity, D, versus an intrinsic transverse relaxation time, $T_{2int}$ and overlays the map with the Pearson Correlation coefficients generated in the 1D mode. In embodiments where MATLAB is used, the map may be produced by, a component related to MATLAB, or external software and map results then being provided to MATLAB. The map may include the third dimension as a color code. As color code can be used, the 1D correlation from $T_2$ or D (as well as the multiplication of both) may be correlated in 3D. This may be performed as element multiplied by element matrix multiplication of maps. In some embodiments, intensity information is removed from the 3D maps and the colors are provided to indicate a degree of correlation with the reference logs. Reference may be had to FIGS. 10 through 13.

Figure 10:
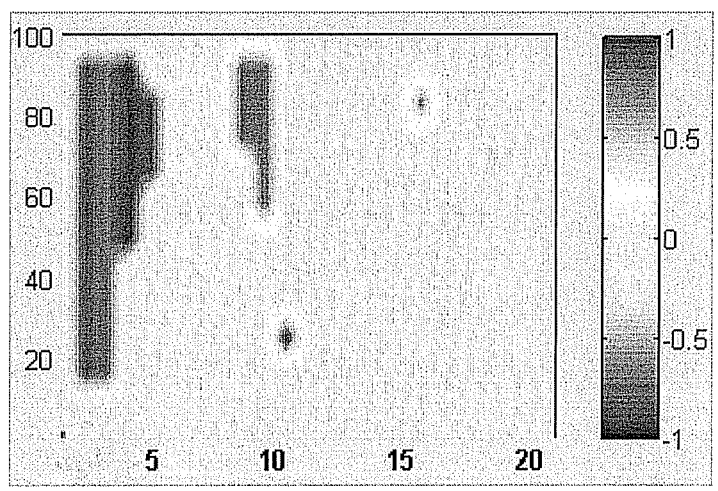
FIG. 10 through FIG. 12 depict exemplary graphic correlation results for three-dimensional (3D) analyses.
Figure 11:
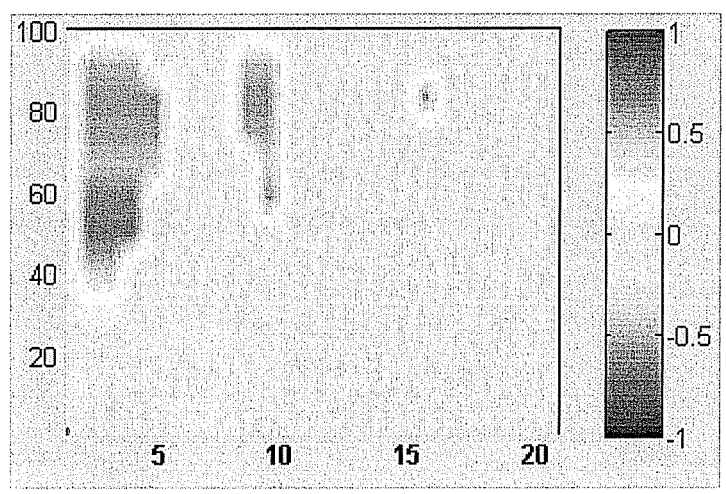
Figure 12:
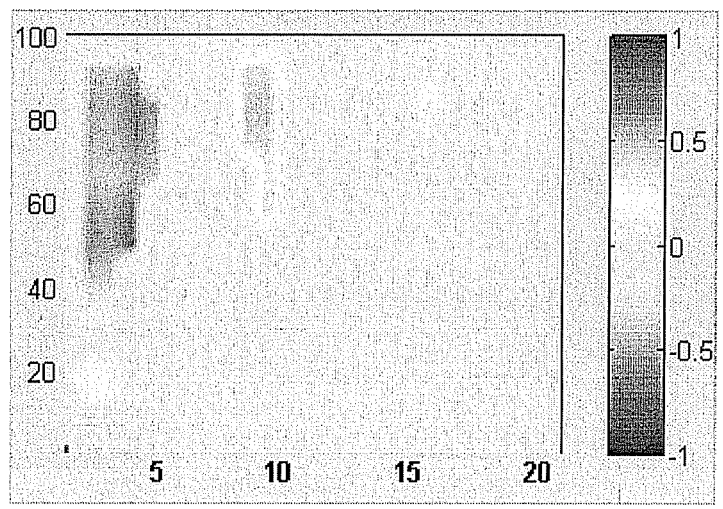

In FIG. 10, the distribution of the diffusivity, D, versus the distribution of the transverse relaxation time, $T_2$, is provided. The depiction includes an overlay of the Pearson correlation for the $T_2$ bins. In FIG. 11, the distribution of the diffusivity, D, versus the distribution of the transverse relaxation time, $T_2$, is provided. The depiction includes an overlay of the Pearson correlation for the D bins. In FIG. 12, the distribution of the diffusivity, D, versus the distribution of the transverse relaxation time, $T_2$, is provided. The depiction includes an overlay of the Pearson correlation for the $T_2$ bins multiplied by the D bins.

Note that as discussed herein, the Pearson coefficient (sometimes known as the Pearson product-moment correlation coefficient, or PMCC) is a measure of the correlation of two variables (e.g., X and Y), where the variables are measured with relation to the same object or organism. The Pearson coefficient is generally denoted as (p), and provides a measure of a tendency of the variables to increase or decrease together (i.e., correlate with each other), where a degree of the tendency is generally defined by a user. The Pearson coefficient is defined as the sum of the products of standard scores of the two measures divided by the degrees of freedom, as provided in Eq. (2):

$$p = \frac{\sum Z_x Z_y}{n-1}; \quad (2)$$

where:
Z represents a Z score, and is assumed to have been calculated using standard deviations having n−1 in the denominator.

Other notation and variations of the Pearson coefficient are known. These other embodiments may also be useful for determining correlation. Accordingly, the embodiment provided herein is merely illustrative and is not limiting of the teachings herein.

The result obtained is equivalent to dividing the covariance between the two variables by the product of their standard deviations. The Pearson coefficient ranges from −1 to 1. A value of 1 shows that a linear equation describes the relationship perfectly and positively, with all data points lying on the same line and with Y increasing with X. A score of −1 shows that all data points lie on a single line but that Y increases as X decreases. A value of 0 shows that a linear model is inappropriate—that there is no linear relationship between the variables.

The Pearson coefficient is a statistic which estimates the correlation of the two given random variables, and is merely exemplary as used herein and is not limiting of the teachings. For example, non-linear tests, such as the test referred to as "mutual information," which is also referred to as a test for "transinformation." The test for mutual information is a measure of how much information can be obtained about one random variable by observing another. As an example, the mutual information of X relative to Y (which represents conceptually the average amount of information about X that can be gained by observing Y) is given by:

$$I(X;Y) = \sum_{y \in Y} p(y) \sum_{x \in X} p(x|y) \log \frac{p(x|y)}{p(x)} = \sum_{x,y} p(x,y) \log \frac{p(x,y)}{p(x)p(y)}. \quad (3)$$

Referring again to the Pearson coefficient, t$_t$he linear equation that best describes the relationship between X and Y can be found by linear regression. This equation can be used to "predict" the value of one measurement from knowledge of the other.

Figure 13:
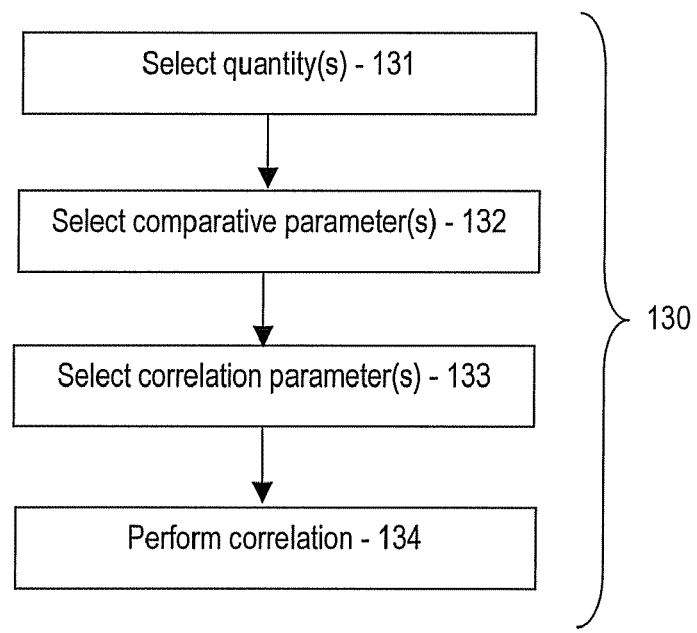
FIG. 13 depicts an exemplary method for determining correlations.

Now with reference to FIG. 13, there is shown an exemplary method for determining correlations 130. The method for determining correlations 130 includes selecting quantities for correlation 131. As an example, this may include selection of $T_2$ bins or D bins. Selection of comparative parameters 132 is performed. This may include selection of parameters such as saturation, resistivity, and other such quantities. Selection of correlation parameters 133 is performed. This may include selecting at least one of 1D, 2D and 3D analyses. Performing correlation 134 is conducted to provide output. Output may be reviewed to determine or qualify correlations in the logging data.

It may be recognized that other statistics may be used. Further, correlation may include production of graphic displays, additional statistics and any other form of output useful to users. In some embodiments, the graphic display includes one of a line graph, a map, a multi-color display, a monochromatic display and a display of varying intensity.

One skilled in the art will recognize that a system that makes use of the teachings herein may be provided. In some embodiments, the system provides improved well logging data which is derived from the correlations.

In support of the teachings herein, various analysis components may be used, including at least one of a digital system and an analog system. Components such as a processor, storage media, memory, input, output, communications link (wired, wireless, pulsed mud, optical or other), user interfaces, software programs, signal processors (digital or analog) and other such components (such as resistors, capacitors, inductors and others) may be included to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a motive force (such as a translational force, propulsional force or a rotational force), a magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described, with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer program product comprising computer readable instructions stored on computer readable media, the instructions for correlating nuclear magnetic resonance (NMR) well logging data with other well logging data, the product comprising instructions for:
   receiving the NMR well logging data;
   receiving the other well logging data;
   determining a tendency of the NMR logging data to correlate with the other logging data; and
   providing output comprising correlation information defining a degree of similarity between the NMR well logging data and the other well logging data.

2. The computer program product as in claim 1, wherein determining comprises at least one of calculating a Pearson product-moment correlation coefficient and testing for mutual information.

3. The computer program product as in claim 1, wherein receiving at least one of the NMR well logging data and the other well logging data comprises receiving data for at least one of one-dimension (1D), two-dimensions (2D) and three-dimensions (3D).

4. The computer program product as in claim 1, wherein determining comprises dividing a covariance between the NMR well logging data and the other well logging data by a product of their respective standard deviations.

5. The computer program product as in claim 1, wherein the NMR well logging data comprises at least one of: longitudinal relaxation time, $T_1$, transverse relaxation time, $T_2$, and diffusivity, D.

6. The computer program product as in claim 5, further comprising establishing a distribution for at least one of the transverse relaxation time, $T_2$, and the diffusivity, D.

7. The computer program product as in claim 5, further comprising determining bins for at least one of the transverse relaxation time, $T_2$, and the diffusivity, D.

8. The computer program product as in claim 1, wherein the other logging data comprises data from assessments of at least one of acoustic, seismic, neutron activation, natural radioactivity, induced gamma radioactivity, resistivity, mud logging, formation lithology and saturation.

9. The computer program product as in claim 1, wherein the determining comprises performing a matrix multiplication.

10. The computer program product as in claim 1, further comprising producing the output as a graphic display.

11. A system for providing correlated well logging data, the system comprising:
    components for executing computer readable instructions stored on computer readable media, the instructions for correlating nuclear magnetic resonance (NMR) well logging data with other well logging data, and comprising instructions for receiving the NMR well logging data; receiving the other well logging data; and determining a correlation coefficient indicative of a tendency of the NMR logging data to correlate with the other logging data; and
    an output for outputting to a user correlation information as the correlated well logging data.

* * * * *